March 9, 1965 J. G. PETERS 3,172,688

CHECK BOOK SYSTEM

Filed Jan. 22, 1962 2 Sheets-Sheet 1

INVENTOR.
JAMES G. PETERS

BY McGrew & Edwards

Attorneys

March 9, 1965 J. G. PETERS 3,172,688

CHECK BOOK SYSTEM

Filed Jan. 22, 1962 2 Sheets-Sheet 2

INVENTOR.
JAMES G. PETERS

BY

McGrew & Edwards

Attorneys 3,172,688

CHECK BOOK SYSTEM

James G. Peters, 1 Penrose Lane, Broadmoor, Colorado Springs, Colo.

Filed Jan. 22, 1962, Ser. No. 167,833
2 Claims. (Cl. 283—58)

This invention relates to a check book system and more particularly to improved check and check stub combinations.

For many persons, accurate bookkeeping relative to a checking account, and periodic reconciling of a check book balance with that of the bank, is a mysterious art fully understood only by an experienced accountant.

Of course, this should not be true for the average checking account and many and varied suggestions have been made for check and check stub combinations attempting to provide a simplified bookkeeping system. However, most previous suggestions attempting to provide a more easily utilized and understood system have only succeeded in compounding the complexity of multiple entries, or raising the cost because of specially cut and fabricated construction. One of the latter has been to provide superposed stubs of varying length or having variation in shaping such that successive ones in a series have a portion extending beyond previous ones. This has often led to bulky check stub records after all of the checks have been utilized.

Accordingly, it is an object of this invention to provide an improved check book construction which promotes accuracy of recording checking account transactions; provides for ease of reconciling a check book balance with a bank balance, reduces the number of entries necessary thereby increasing accuracy and reducing time expenditure, and which, after all checks have been utilized, results in a very small packet of stubs which are easily stored.

It is yet another object of the invention to provide improved, inexpensive, and easily manufactured check and check stub combinations which are convenient to use.

Briefly, in one embodiment, a check book system according to the concepts of this invention utilizes a plurality of identical stub and check combinations, including an embossed tear line between them for ease of removing the check from the stub. The free end of each of the stubs is fixed to a cover which may be a loose-leaf type arrangement or a bound volume and are fixed in relative position to one another. The check portion is printed with conventional negotiable instrument legends and the stub is imprinted with legends to indicate, among other things, a previous total, the amount of the particular check with which a stub is associated, and a lower legend indicating a balance. The combination stubs and checks are fixed in overlapping position in a manner so as to expose on each stub only two lower lines, of which the upper indicates the amount of the check and the lower one indicates the "balance." In this arrangement, it is possible to maintain a running balance on the stub portion as checks are consecutively written without the necessity of transposing figures from stub to stub.

Other objects, further features and advantages, and a clearer understanding of the concepts of the instant invention will be obvious to those skilled in the art from a study of the following detailed drawing description in which like reference numerals are used to designate like parts in the several views. In these drawings:

FIG. 2 is an enlarged detail of one of the combination check and check stubs used in the arrangement of FIG. 1;

FIG. 3 is a fragmentary view of a subsequent layer of check and check stub combinations to that shown in FIG. 1; and FIG. 4 is a fragmentary view indicating the manner of utilizing a check book system according to this invention in the entry of a deposit.

Figures 2, 3, 4:
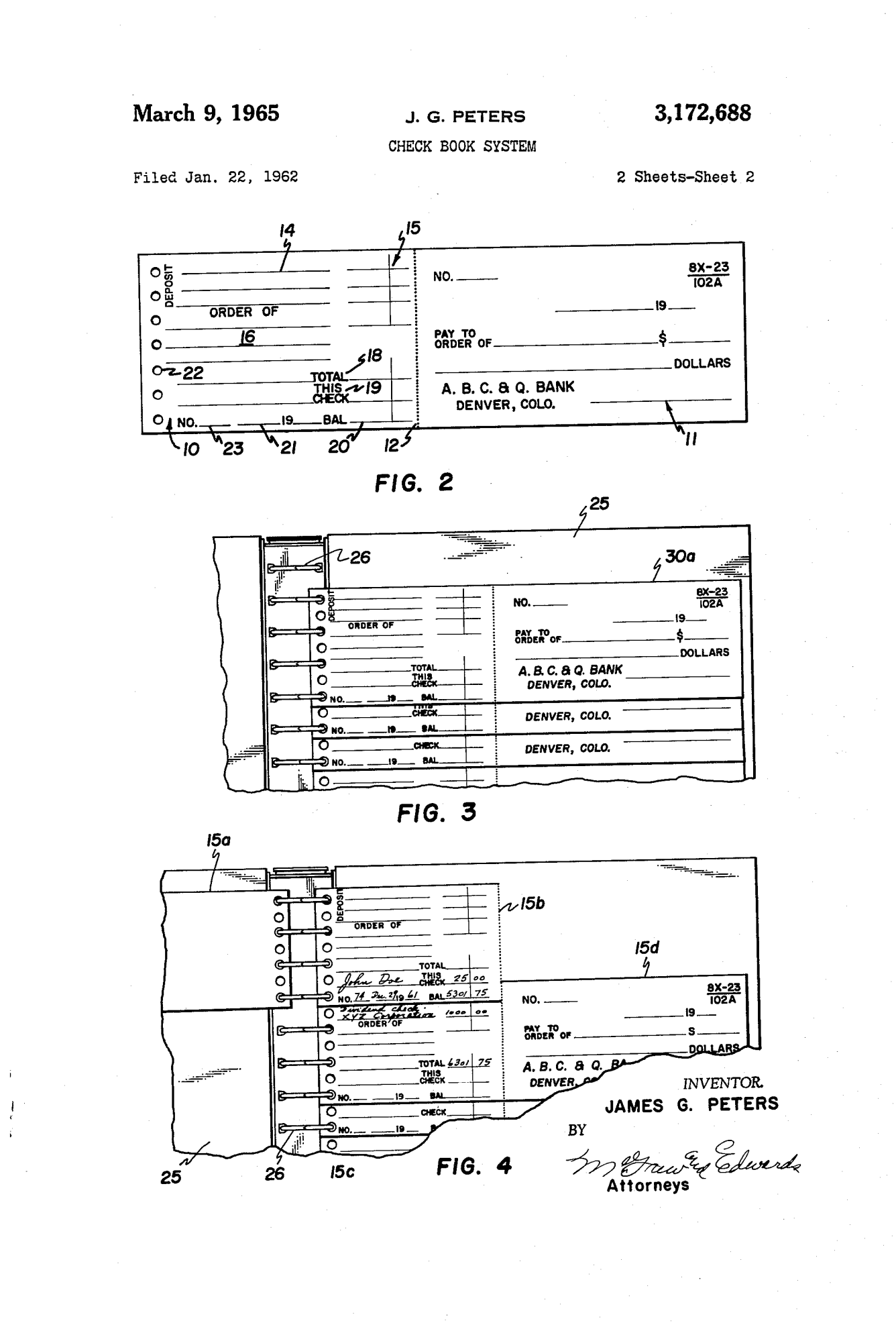
Figure 1:
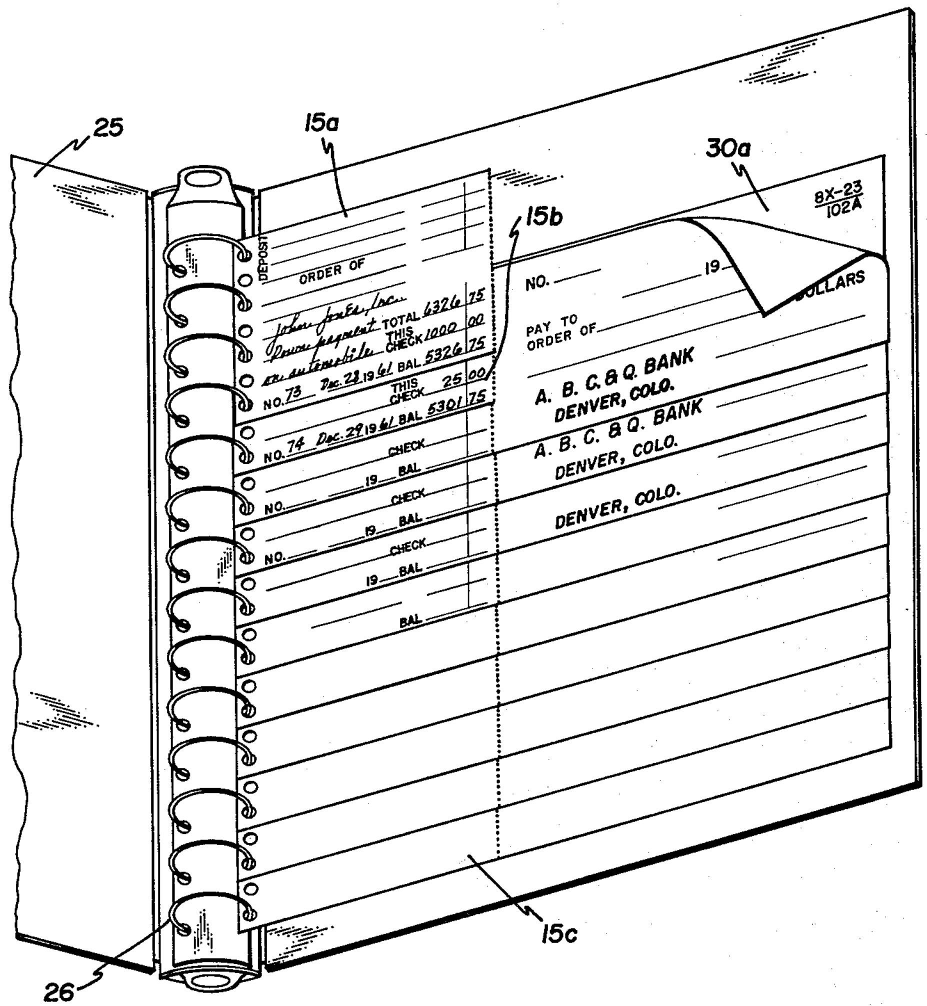
FIG. 1 is an isometric view of a check book system embodying the concepts of this invention.

My checking system is comprised of a plurality of identical combination stub portions and check portions. One of the stub and check combinations is shown in FIG. 2 as comprised of a stub portion 10 and a check portion 11 connected by a perforated tear line 12. The check portion is conventional and will not be described in more detail. The stub portion 10 includes a plurality of horizontal and vertical lines. A first group of horizontal lines 14 are for recording deposit sources and the combination of horizontal and vertical lines 15 are for purposes of recording the monetary amount of each deposit. The horizontal lines 16 are for the purpose of recording the payee of a particular check. The legend 18 and associated horizontal and vertical lines are for the total of the balance from a previous stub and any deposit. The legend 19 and associated horizontal and vertical lines are for recording the amount of the check which is attached to that particular stub. The lowermost legend 20 is indicative of a balance which is recorded within the areas defined by the horizontal and vertical lines immediately to the right thereof and is, of course, the difference between the balance 18 and the check amount 19.

To the left of the balance 18 is a space 23 for recording a check number and a section 21 for recording the date of the check.

In a preferred embodiment, a plurality of these combination stub and checks are assembled in a loose-leaf binder in a particular manner to be described immediately below. To this end, a plurality of apertures 22 are formed through the free end of the stub in equi-spaced relation to each other.

A preferred loose-leaf binder arrangement is shown in FIG. 1 as including the loose-leaf binder 25 having a plurality of equi-spaced selectively openable rings 26 arranged to support a plurality of the stub and check combinations of FIG. 2 in a preferred overlapping arrangement. In this arrangement, the uppermost check and stub combination is fully exposed while each of the subsequent ones are only partially exposed. The degree of coverage is such that only the "this check" legend 19, space for a payee or other information to be entered to the immediate left, and "balance" legend 20, with their associated blank spaces, are visible.

In FIG. 1 the uppermost stub 15*a* has had its associated check detached and the transaction has been suitably recorded on the retained stub portion. Likewise, the second stub 15*b* has had its check portion removed and the subject matter of the transaction has been recorded on its retained stub. However, note that only the "this check" and "balance" entries are visible.

In FIG. 1 two transactions were recorded and a running balance was kept in the following manner: The check No. 73 (which is 15*a* in the drawings) is made to the order of John Jones and the total of the check is recorded as $1,000.00. This is placed immediately below the previous total of $6,326.75. The balance resulting was $5,326.75. When the second check No. 74 (indicated as **15*b*** in FIG. 1) has been executed, the amount of the check, namely $25.00, was placed in the proper space on the stub which, in the preferred overlapping arrangement of this invention, is immediately below the previous balance, whereby, without transposition of figures, subsequent balance $5,301.75 was rapidly calculated. This same procedure may be followed in each of the subsequent transactions, i.e., there is no necessity of transposing a balance from one check stub to another; but rather, immediately upon entering the amount of a given check, the balance may be immediately calculated and that balance used in calculating the balance of subsequent transaction.

From the foregoing, it should be clear that it is necessary for the horizontal lines of the various blank portions of the stubs to be substantially perpendicular to an axis through the loose-leaf rings in order that subsequent checks precisely cover all entries immediately above the "this check" entry so as running balance may be kept. Also, in order to have stability and cooperation between the plurality of combination check stubs and checks according to this invention, it is necessary that there be overlap of the apertures 22 of a plurality of the check and check stub combinations. I have shown seven apertures in the drawings, which is a preferred number, and four loose-leaf rings pass through each check. This number provides for substantial elimination of relative movement between the adjacent stubs. Of course, a lesser number might be used such as three or five, if desired. However, the number selected must be sufficient as to enable overlapping of adjacent combination check stubs and checks while maintaining stability and desired relative positioning between them.

Once the uppermost layer of check and check stub combinations has been used, such as using the entire group of **15*a* through the lowermost one 15*c*, all of the stubs, except the lowermost, are turned. The lowermost one is removed from the position in that layer and placed at the top of the following layer of unused check stubs and check combinations. FIG. 3 is indicative of the appearance of a subsequent layer in which the uppermost space is blank and arranged for reception of the stub 15*c* in order that the system may be continued, i.e., the stub 15*c* is placed over the topmost check stub and check combination 30*a***.

For deposits, a slightly different procedure is utilized and reference to FIG. 4 will make an explanation thereof clear. For purposes of this explanation, it is assumed that a deposit is to be made after checks **15*a* and 15*b* have been utilized. To thereafter record a deposit, stub 15*a* is turned. Stub 15*b* is removed from its normal position in the layer and placed directly above the groups of horizontal and vertical lines 14 and 15 of the following stub 15*d*. Then the source of the deposit in FIG. 4 indicated to be a dividend check of an XYZ corporation and the amount $1,000.00 are entered. This figure will appear below the previous balance shown on stub 15*b*. When combining the two sets of figures, without transposition of either, a new balance of $6,301.75 was reached and entered on the "total" line 18. Stub 15*b* may be returned to its original position in the layer and stub 15*a*** turned back face up. The simple bookkeeping system described above may then be continued.

I have discussed my invention in combination with a loose-leaf binder type arrangement, but it is equally applicable to a bound book type arrangement. However, in the bound book arrangement, it will be necessary to transpose the balance from the last stub of a previous page or layer to the top stub of a subsequent page or layer.

My system and using a loose-leaf arrangement result in considerablv increased accuracy in keeping a running balance by elimination of transposition of figures. The system provides ease in reconciling a check book balance with a bank balance because of a progressive credit and debit system, without necessity of transposing figures, which is substantially the manner in which a bank statement is prepared.

With the loose-leaf arrangement when a quantity of checks, as at the end of a year, have been written, and the stubs thereof are to be retained as a record, they may be removed from the loose-leaf binder, stacked into a small, neat packet and held together by an elastic band or the like.

Also, with perforate stubs and a loose-leaf binder, incorrectly made-out or void checks, which frequently occur, may be discarded. In a conventional check book arrangement voids must be entered and transposition of figures and related complication results. But in my system, when a check is incorrectly made out and the stub and check are discarded, a new one may be inserted in its place over the same loose-leaf binder posts, thereby maintaining continuity without interruption for transposition of figures.

Having thus described my invention in detail and with sufficient particularity as to enable those skilled in the art to practice it, what I desire to have protected by Letters Patent is set forth in the following claims.

I claim:

1. As a check book system, a plurality of identical check and stub combinations, the respective checks and stubs connected to each other through a perforated tear line, the free end of the stub of each of the plurality of combinations having a series of equi-spaced aligned apertures formed therethrough and fixed relative to a loose-leaf cover by mounting on the spaced rings thereof and relative to all of the other combinations by such mounting, each of said combinations partially overlapping a subsequent lower one when mounted in the cover, each check portion of the combination being imprinted with conventional negotiable instrument legends, the stub portion of each of the combinations including a plurality of legends and associated areas for entry of the designated subject matter, an upper of the legends on the stub portion indicating a "total" entry, an intermediate one indicating a "this check" entry, and a lower one indicating a "balance" entry, the latter three legends being imprinted substantially one under the other, the amount of overlap between the respective adjacent check and stub combinations being only such that the legends indicative of "this check" and "balance" are exposed to provide a simple bookkeeping system and maintain a running balance on the stub portions as the checks are consecutively written and removed without the necessity of transposing figures from stub to stub.

2. In combination, as a check book system, a plurality of identical check and stub combinations and a ring type loose-leaf cover, the respective checks and stubs connected to each other through a perforated tear line, the free end of the stub of each of the plurality of combinations having a series of equi-spaced aligned apertures formed therethrough and fixed relative to the ring type loose-leaf cover by mounting over the rings thereof and relative to all of the other combinations by such mounting, each of said combinations partially overlapping a subsequent one when mounted in the cover, each check portion of the combination being imprinted with conventional negotiable instrument legends, the stub portion of each of the combinations including a plurality of legends and associated areas for entry of the designated subject matter, an upper of the legends indicating a "deposit" entry on the stub portion, a next lower legend indicating a "total" entry, an intermediate one indicating a "this check" entry, and a lower one indicating a "balance" entry, the latter three legends being imprinted substantially one under the other providing a simple single entry bookkeeping system, the degree of overlap between the respective adjacent check and stub combinations being only such that the legends indicative of "this check" and "balance" are exposed for maintaining a running balance on the stub portions as the checks are consecutively written and removed by subtracting the amount entered adjacent the "this check" legend directly from the "balance" entry on a previous stub without the necessity of transposing figures from stub to stub.

References Cited in the file of this patent

UNITED STATES PATENTS

| | | |
|---|---|---|
| 538,491 | Angell | Aug. 30, 1895 |
| 2,244,908 | Finnila | June 10, 1941 |